(12) United States Patent
Nakagawa

(10) Patent No.: US 12,291,001 B2
(45) Date of Patent: May 6, 2025

(54) INSOLE MANUFACTURING METHOD

(71) Applicant: REVE INC., Nara (JP)

(72) Inventor: Satoshi Nakagawa, Kashiba (JP)

(73) Assignee: REVE INC., Nara (JP)

( * ) Notice: Subject to any disclaimer, the term of this patent is extended or adjusted under 35 U.S.C. 154(b) by 176 days.

(21) Appl. No.: 18/274,462

(22) PCT Filed: Jul. 26, 2021

(86) PCT No.: PCT/JP2021/027466
§ 371 (c)(1),
(2) Date: Jul. 27, 2023

(87) PCT Pub. No.: WO2022/162973
PCT Pub. Date: Aug. 4, 2022

(65) Prior Publication Data
US 2024/0092047 A1   Mar. 21, 2024

(30) Foreign Application Priority Data

Jan. 29, 2021   (JP) ................................. 2021-012627

(51) Int. Cl.
*B29D 35/12*   (2010.01)
*A43B 7/28*   (2006.01)
(Continued)

(52) U.S. Cl.
CPC .............. *B29D 35/142* (2013.01); *A43B 7/28* (2013.01); *B29C 43/12* (2013.01); *B29C 43/52* (2013.01);
(Continued)

(58) Field of Classification Search
CPC ............ B29C 43/12; B29C 63/22; A43B 7/28
See application file for complete search history.

(56) References Cited

FOREIGN PATENT DOCUMENTS

DE   3514754 A * 10/1986 ............. A43B 17/14
JP   S55-158902 U   11/1980
(Continued)

OTHER PUBLICATIONS

International Search Report for PCT/JP2021/027466 dated Aug. 24, 2021.
PCT written opinion dated Aug. 24, 2021.

*Primary Examiner* — Atul P. Khare
(74) *Attorney, Agent, or Firm* — Yokoi & Co., U.S.A.; Toshiyuki Yokoi

(57) ABSTRACT

To provide an insole more easily fitting to a purchaser's foot. A method for manufacturing an insole comprises: a first step of forming a footprint resin portion 12 having a footprint shape having a predetermined thickness using a thermoplastic resin which melts at a predetermined temperature; a second step of performing shrink processing such that the footprint resin portion 12 is covered with a film, and thereafter vacuum packing the footprint resin portion covered with the film in a nylon polyethylene bag; a third step of heating the insole 10 manufactured through the first step and the second step at a predetermined temperature; and a fourth step of attaching the insole 10 having the footprint resin portion 12 melt by the third step to the inside of a shoe 2 of a user, and hardening the footprint resin portion 12 by leaving the shoe 2 stand for a predetermined time period while the user is wearing the shoe 2.

4 Claims, 4 Drawing Sheets

(51) Int. Cl.
  *B29C 43/12* (2006.01)
  *B29C 43/52* (2006.01)
  *B29C 63/02* (2006.01)
  *B29C 63/22* (2006.01)
  *B29D 35/00* (2010.01)
  *B29D 35/14* (2010.01)
  *B29K 67/00* (2006.01)
  *B29K 105/00* (2006.01)
  *B29K 105/02* (2006.01)
  *B29L 31/50* (2006.01)

(52) U.S. Cl.
  CPC .............. *B29C 63/02* (2013.01); *B29C 63/22* (2013.01); *B29D 35/0054* (2013.01); *B29K 2023/06* (2013.01); *B29K 2067/04* (2013.01); *B29K 2105/02* (2013.01); *B29K 2105/256* (2013.01); *B29L 2031/504* (2013.01)

(56) References Cited

FOREIGN PATENT DOCUMENTS

| | | | | |
|---|---|---|---|---|
| JP | S64-20804 | A | | 1/1989 |
| JP | 3011472 | U | | 5/1995 |
| JP | 2005-198921 | A | | 7/2005 |
| JP | 2013-212335 | A | | 10/2013 |
| JP | 2014-108567 | A | | 6/2014 |
| JP | 2015-226484 | A | | 12/2015 |
| JP | 2020137984 | A | * | 9/2020 |
| KR | 101702804 | B1 | * | 2/2017 ............... A43D 8/16 |

* cited by examiner

INSOLE MANUFACTURING METHOD

TECHNICAL FIELD

The present invention relates to a method for manufacturing an insole.

BACKGROUND ART

Conventionally, insoles, which are sock linings placed on the inner soles of hard shoes, have been developed for the purpose of size adjustment and wearing comfort, and are used in a wide range of shoes from sport shoes to daily life shoes.

As a technology relating to the present invention, for example, Patent Document 1 discloses a shoe insole characterized by being obtained as follows: a mat board having a thickness of about 0.5 mm is laid on the bottom of a mold frame, a silicone resin is applied to the mat board to a thickness of about 7 mm, a user of the shoe insole stands on one bare foot on an insole material formed by covering the surface of the silicone resin with a wrap film, and applies force thereto to take a footprint, and after the silicone resin for the insole material hardens, the insole material with the footprint formed thereon is cut with scissors to fit the shape of the shoe.

Patent Document 2 discloses a method for manufacturing a sole mold in which first a foot in the current state is normalized and thereafter a mold for the normalized foot is made, differently from conventional methods of manufacturing a sole mold which emphasize only the fabrication of a precise mold of a current foot.

RELATED ART DOCUMENTS

Patent Documents

Patent Document 1: JP 2005-198921 A
Patent Document 2: JP 2013-212335 A

SUMMARY OF THE INVENTION

Problem to be Solved by the Invention

Although various insoles have been developed in recent years, these insoles have a shape accommodating an average foot shape, and therefore they do not necessarily have a shape fitting purchasers. Further, although sock linings precisely fitting a foot shape and the like have also been developed as seen in Patent Documents 1 and 2, the following problems remain: they are burdensome, time consuming, and costly.

The objective of the present invention is to provide an insole more easily fitting a purchaser's foot.

Means for Solving the Problems

A method for manufacturing an insole according to the present invention comprises: a first step of forming a footprint resin portion having a footprint shape having a predetermined thickness using a thermoplastic resin which melts at a predetermined temperature; and a second step of performing shrink processing such that the footprint resin portion is covered with a film, and thereafter vacuum packing the footprint resin portion covered with the film in a nylon polyethylene bag.

Further, the method for manufacturing the insole according to the present invention comprises a third step of heating the insole manufactured through the first step and the second step at a predetermined temperature; and a fourth step of attaching the insole having the footprint resin portion melt by the third step to the inside of a shoe of a user, and hardening the footprint resin portion by leaving it stand for a predetermined time period while the user is wearing the shoe.

Further, the method for manufacturing the insole according to the present invention preferably comprises a fifth step of peeling the film after the third step and the fourth step, and thereafter attaching a flexible sheet portion to a side of the footprint resin portion to be in contact with the user's sole.

Further, in the method for manufacturing the insole according to the present invention, the thermoplastic resin preferably comprises a polycaprolactone resin which melts at 60 to 70° C., and the film preferably comprises a polyethylene film.

Further, in the method for manufacturing the insole according to the present invention, the predetermined thickness is preferably set to 2 mm to 3 mm.

Further, in the method for manufacturing the insole according to the present invention, the nylon polyethylene bag preferably comprises at least two layers of nylon and polyethylene.

Effects of the Invention

The present invention can provide an insole fitting a purchaser's foot.

DESCRIPTION OF EMBODIMENT

Figure 1A:
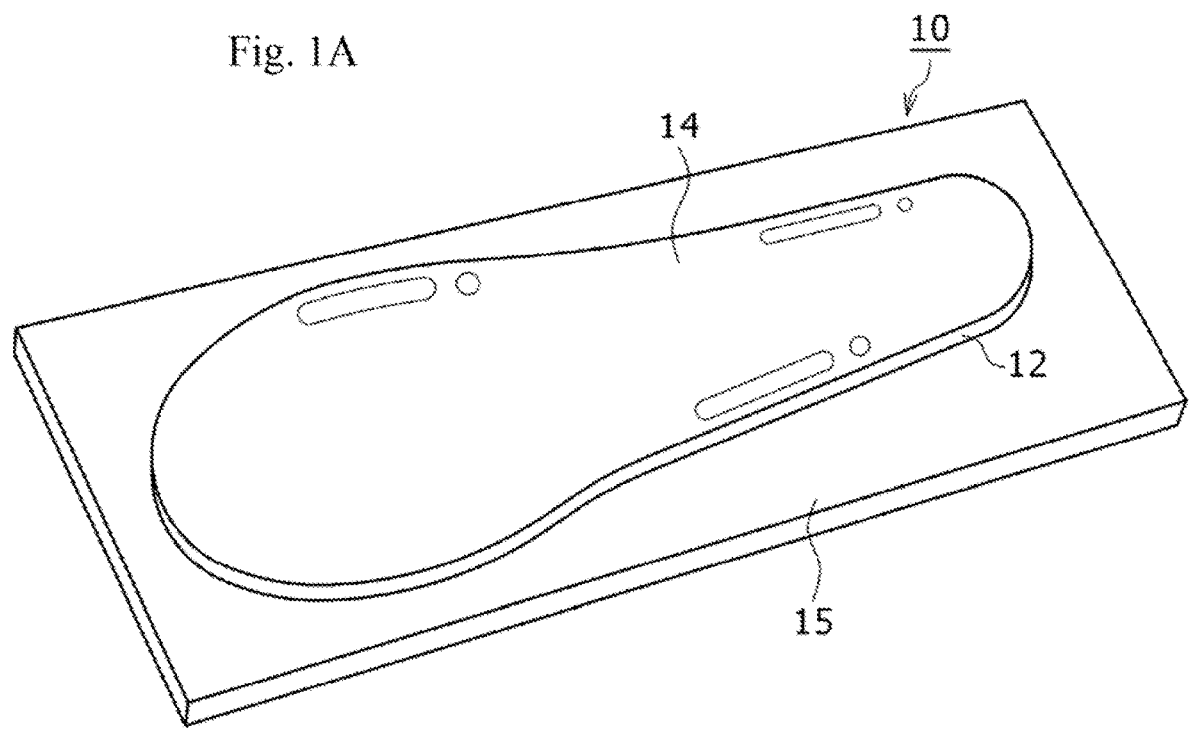
FIGS. 1A and 1B show insoles manufactured by a method for manufacturing an insole according to an embodiment of the present invention.

Hereinafter, an embodiment according to the present invention is explained in detail with reference to the accompanying drawings. In the following, like elements are assigned the same reference numerals in all the figures in the drawings, and a repeated description is omitted. In addition, in the description in the text, the reference numerals mentioned previously are used if necessary.

Figure 1B:
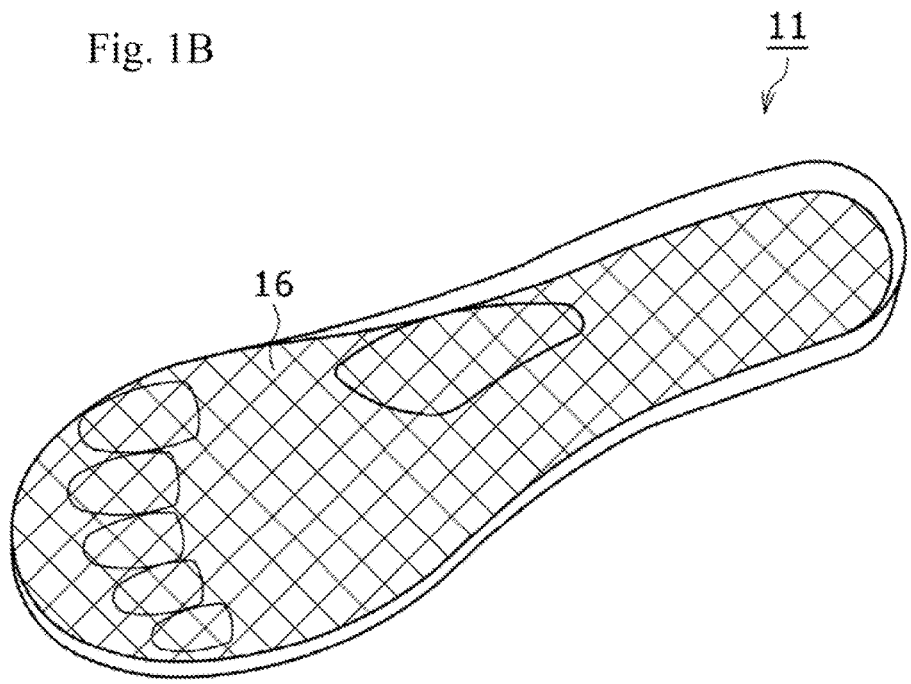

FIGS. 1A and 1B show insoles 10 and 11 manufactured by a method for manufacturing an insole according to an embodiment of the present invention.

2A to 2C show how to form the insole 11 fitting a foot 3 of a user using the insole 10.

Figure 3:
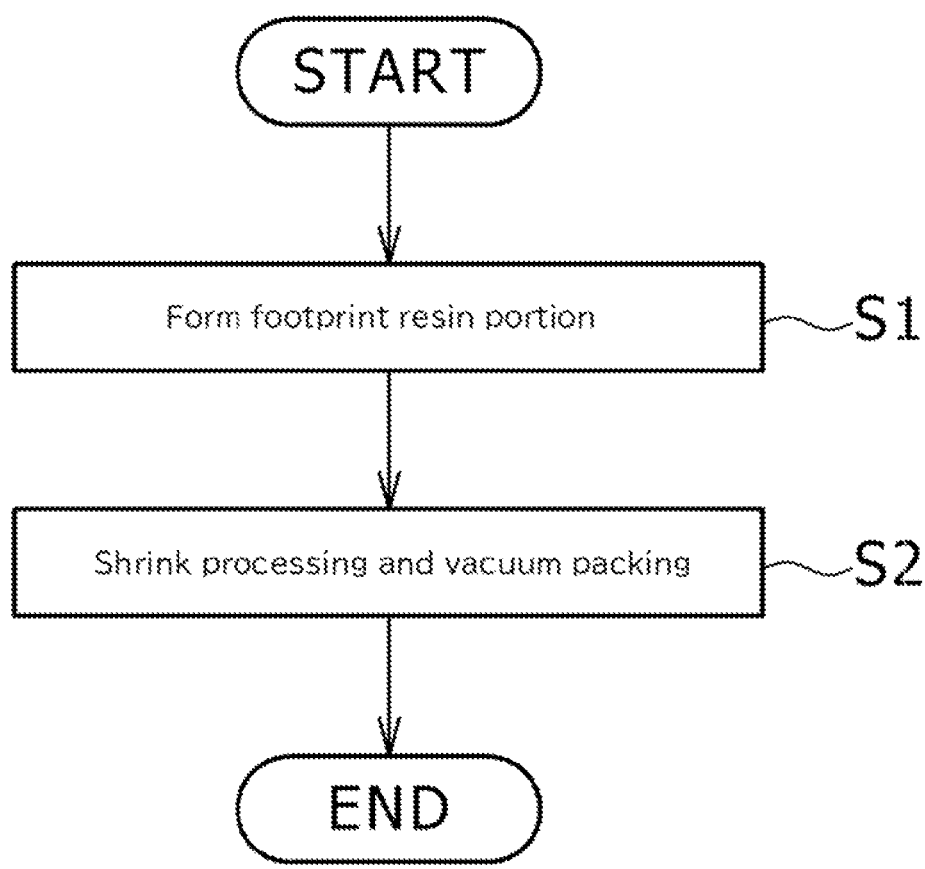
FIG. 3 is a flow chart showing a procedure for manufacturing an insole in the method for manufacturing the insole according to the embodiment of the present invention.
Figure 4:
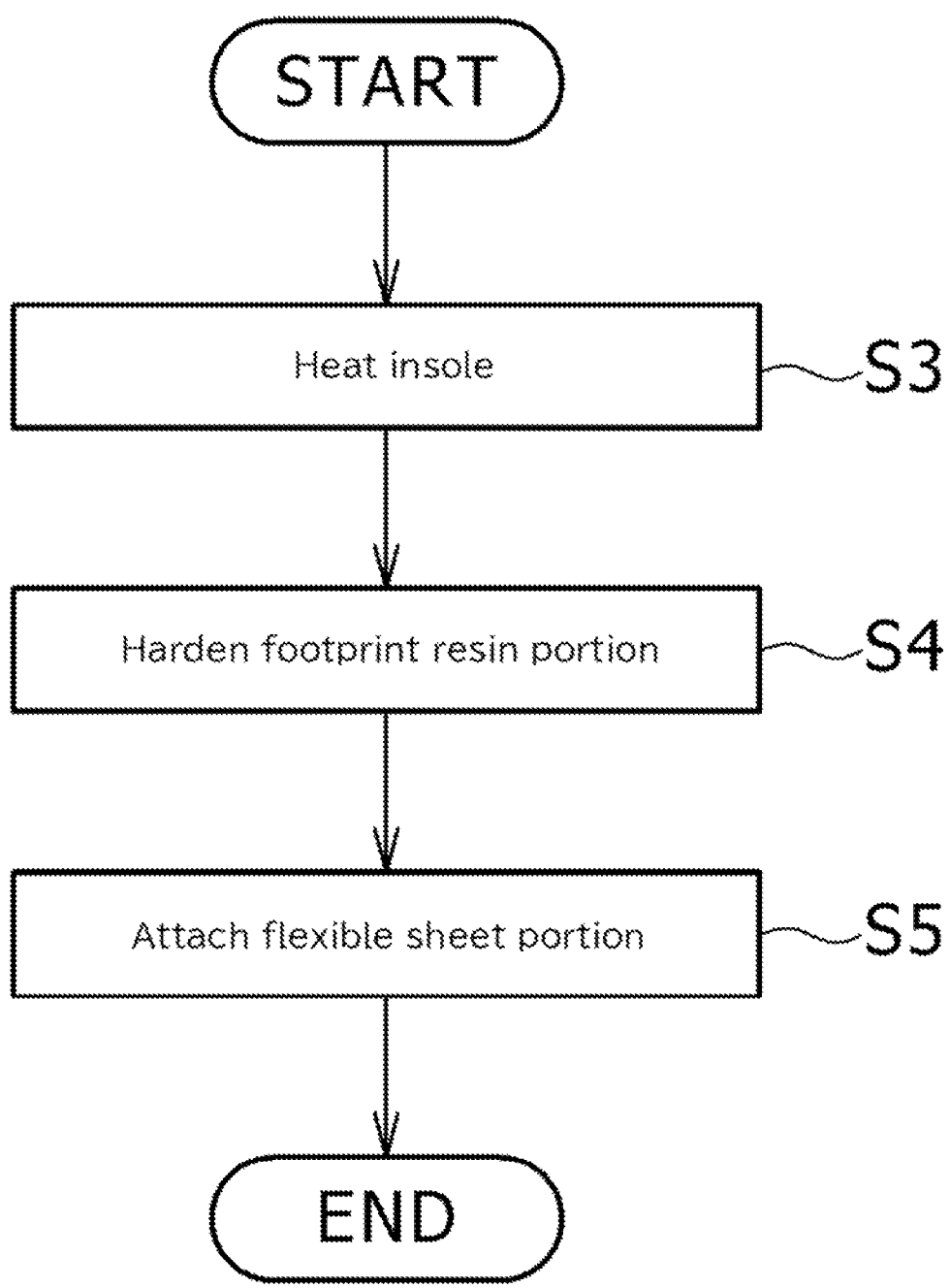
FIG. 4 is a flow chart showing a procedure for forming an insole in the method for manufacturing the insole according to the embodiment of the present invention.

FIG. 3 is a flow chart showing a procedure for manufacturing the insole 10 in the method for manufacturing the insole according to the embodiment of the present invention. FIG. 4 is a flow chart showing a procedure for forming the insole 11 in the method for manufacturing the insole according to the embodiment of the present invention.

The insole 10 is a sock lining which can be fitted to the shape of the foot 3 of the user. The insole 10 comprises a footprint resin portion 12, a film portion 14, and a vacuum-packed portion 15.

The footprint resin portion 12 is a member having a footprint shape having a predetermined thickness and formed using a thermoplastic resin which melts at a predetermined temperature. Although the thermoplastic resin used is preferably a polycaprolactone resin which melts at 60 to 70° C., it is needless to say that other thermoplastic resins may be used.

Although the footprint resin portion 12 suitably comprises the polycaprolactone resin as described above, for example, polylactic acid (PLA), polyethylene (PE), high density polyethylene (HDPE), medium density polyethylene (HDPE), low density polyethylene (LDPE), polypropylene (PP), polyvinyl chloride (PVC), polyvinylidene chloride, polystyrene (PS), polyvinyl acetate (PVAc), polyurethane (PUR), Teflon(R)-(polytetrafluoroethylene, PTEh), ABS resin (acrylonitrile-butadiene-styrene resin), AS resin, acrylic resin (PMMA), and the like can be also used.

The thickness of the footprint resin portion 12 is suitably set to 2 mm to 3 mm, and it is more preferably set to 2.5 mm. The footprint resin portion 12 is formed by injection molding.

The film portion 14 is formed by performing shrink processing such that the footprint resin portion 12 is covered with a film. The film portion 14 is formed of a polyethylene (PE) film, covers the whole surface of the footprint resin portion 12, and is shrunk while air is removed to seal the footprint resin portion 12.

Although the polyethylene (PE) film is suitably used for covering the footprint resin portion 12 as described above, other film materials may be used, and PET (polyethylene terephthalate), PP (polypropylene), and PVC (polyvinyl chloride) can also be used, for example.

The vacuum-packed portion 15 is formed by vacuum-packing in a nylon polyethylene bag. The nylon polyethylene bag is preferably made of a material which does not shrink when heated in a water bath. Here, the nylon polyethylene bag formed of two layers where nylon (NY) faints an outer layer and polyethylene (PE) forms an inner layer is explained. However, the nylon polyethylene bag may be formed of three or more layers. For example, in addition to the two layers described above, a layer of linear low density polyethylene may be disposed. The vacuum-packed portion 15 preferably has a cutout so that it is easy to be opened after the water bath. Covering the footprint resin portion 12 with the vacuum-packed portion 15 can give protection from dust and the like, which is convenient for storage. Although in the above description, polyethylene (PE) is disposed as the inner layer of the two-layered nylon polyethylene bag, the inner layer may be of polypropylene (PP).

Next, a procedure for manufacturing the insole 10 using the method for manufacturing an insole according to the embodiment of the present invention is explained. Firstly, the footprint resin portion 12 is formed (S1). Specifically, after the polycaprolactone resin is mixed with other materials and the like, the footprint resin portion 12 having a footprint shape having a thickness of 2.5 mm is molded by injection molding.

Next, after shrink processing is performed such that the footprint resin portion 12 is sealed by the film, the footprint resin portion covered with the film is vacuum-packed in the nylon polyethylene bag (S2). Specifically, the shrink processing is performed such that the whole surface of the footprint resin portion 12 is covered with a polyethylene film. The polyethylene film used can seal the footprint resin portion 12 without sticking to it. Further, after Step S2 is performed, the footprint resin portion 12 covered with the film is coated with the vacuum-packed portion 15 formed of the nylon polyethylene bag as shown in FIG. 1A.

Through Step S1 and Step S2, the insole 10 formed of the footprint resin portion 12 and the film portion 14 is completed as shown in FIG. 1A.

Next, after this insole 10 is handed to a user and the like, the user forms the insole 11 using the method for manufacturing the insole according to the embodiment of the present invention. In the following, a procedure for forming the insole 11 is described.

Figure 2A:
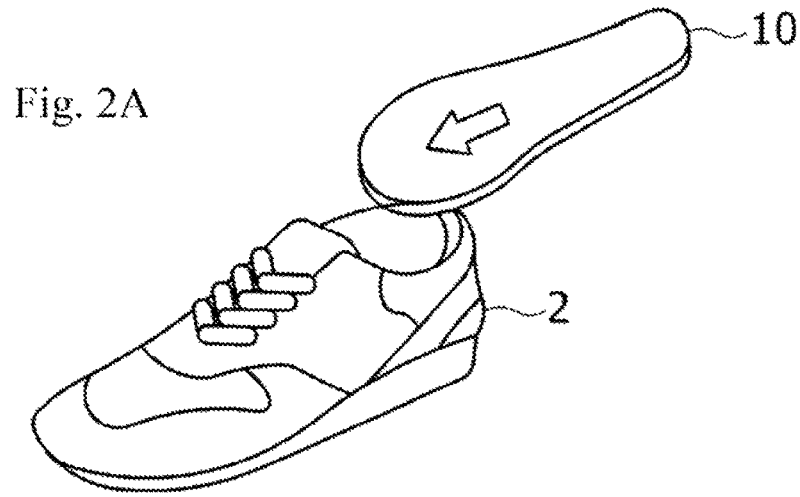
FIGS. 2A to 2C show how to form an insole fitting a user by the method for manufacturing the insole according to the embodiment of the present invention.

Firstly, the insole 10 is heated (S3). Specifically, the insole 10 is placed in a vessel and the like containing hot water warmed to a temperature of 60 to 70° C. or higher at which the footprint resin portion 12 melts, and the insole 10 is melt in the water bath. The insole 10 warmed as just described is laid on an inner sole in a shoe 2 of the user as shown in FIG. 2A. Here, although the footprint resin portion 12 of the insole 10 is melt and liquefied, since the film portion 14 is formed in the footprint shape, defamation hardly occurs, allowing the footprint resin portion 12 to maintain the footprint shape. After the insole 10 is heated in Step S3, the footprint resin portion 12 covered with the film is taken out using the cutout in the vacuum-packed portion 15 and the like. The vacuum-packed portion 15 is formed of the nylon polyethylene bag, has excellent heat resistance, does not shrink, and can maintain the shape of the footprint resin portion 12 covered with the film.

Next, the footprint resin portion 12 is hardened (S4). Specifically, after the insole 10 comprising the footprint resin portion 12 melt is placed on the inner sole in the shoe 2 of the user, the shoe 2 is put on by the foot 3 of the user as shown in FIG. 2B.

Figure 2B:
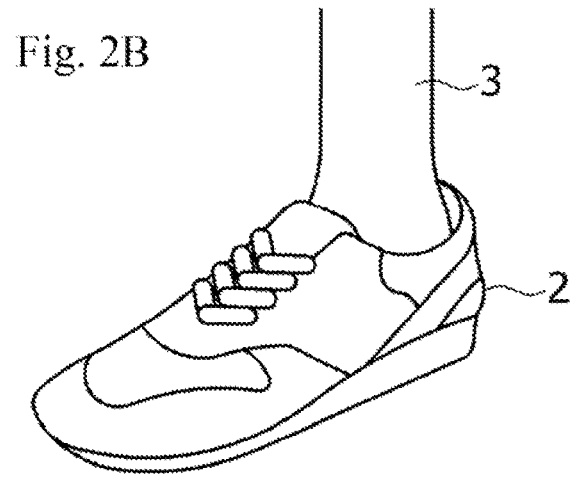

As shown in FIG. 2B, pressure is added to the insole 10 by the user putting on the shoe 2 and standing up to apply the user's weight. Here, since the footprint resin portion 12 is liquefied, the face side of the footprint resin portion 12 is deformed along the shape of the foot 3 of the user, and the reverse side of the footprint resin portion 12 is deformed along the shape of the inner sole of the shoe 2. Further, although the film portion 14 is formed in the footprint shape, its shape changes corresponding to defamation of the footprint resin portion 12.

By leaving it stand for 10 to 15 minutes in such a state, the footprint resin portion 12 is hardened, and the insole 11 fitting the foot 3 of the user is completed. It is noted that although in the above description, the shape of the footprint resin portion 12 is formed by the user standing up thereon, pressure may be applied depending on the posture while the shoe 2 is used. In the case where the shoe 2 is a loose-fit shoe and the like (for example, a leather shoe) instead of a tight-fit shoe, a sponge material or the like for forming the shape of the bottom surface side of the insole 10 liquefied may be placed, and thereafter the insole 10 may be laid to shape the face side to fit the shape of the foot 3 by the foot 3 of the user putting on the shoe 2.

Figure 2C:
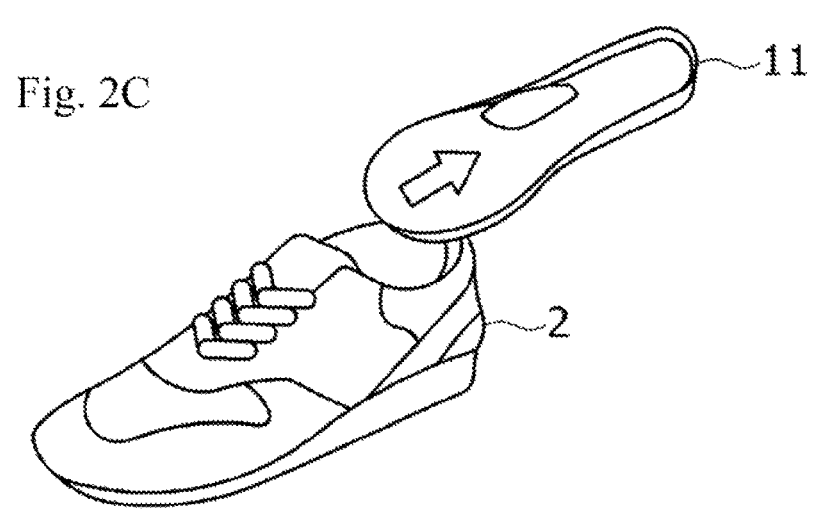

Subsequently, after the insole 11 is taken out as shown in FIG. 2C, a sponge sheet 16 as a flexible sheet portion is bonded thereto (S5). Specifically, the film portion 14 of the insole 11 taken out from the shoe 2 is peeled.

Then, the sponge sheet 16 is bonded to the side of the footprint resin portion 12 to be in contact with the sole of the foot 3 of the user, and an unnecessary part is cut off to obtain a desired shape. This completes the insole 11 fitting the foot 3 of the user as shown in FIG. 1B.

Subsequently, the insole 11 having the sponge sheet 16 bonded thereto is placed again on the inner sole of the shoe 2, and the user puts on the shoe 2. This results in the insole 11 completely fitting the foot 3 of the user. Accordingly, there is an advantage in that when having exercise, for example, such as running, the user can run while keeping good grip, and therefore the user can make even better time.

According to the method for manufacturing the insole according to the embodiment of the present invention, the face side of the insole 11 is molded along the shape of the foot 3 of the user, and the reverse side of the insole 11 is molded along the shape of the shoe 2. In other words, since the insole 11 is molded on both the sides, the insole 11 having a shape optimal to both of the foot 3 and the shoe 2 of the user can be molded, which is a remarkable effect.

The insole 10 manufactured by the method for manufacturing the insole according to the embodiment of the present invention comprises the footprint resin portion 12 which melts at 60 to 70° C., and therefore can be liquefied easily in general households and the like using a water bath for a few minutes (for example, 2 to 3 minutes).

In addition, in the insole 10, the footprint resin portion 12 solidified in a footprint shape is covered with the film portion 14 which is laminated on the footprint resin portion 12 to seal it as described above, and therefore even when the footprint resin portion 12 is liquefied, the footprint shape is maintained.

Although it is necessary that the insole 10 comprising the footprint resin portion 12 liquefied by the water bath is placed on the inner sole of the shoe 2 of the user, and then the user puts on the shoe 2 as described above, since the footprint resin portion 12 can be melt at 60 to 70° C., there is an advantage in that the insole 11 fitting the user can be formed while the user does not suffer a burn even though putting on the shoe 2 with a bare foot.

By the user putting on the shoe 2 to apply pressure, the face side of the footprint resin portion 12 can be formed into a shape completely fitting the foot 3 of the user while the reverse side of the footprint resin portion 12 can completely fit the shape of the inner sole of the shoe 2. In other words, there is an advantage in that the best condition can be provided when the user wears a pair of the shoe 2 and has exercise and the like.

Conventional insoles have been formed such that a recess and a protrusion for shank and heel parts are formed in general shapes. According to the method for manufacturing the insole according to the embodiment of the present invention, instead of forming such general shapes, a shape can be molded such that not only the user's shank and heel parts can be completely fitted, but also five fingers of the foot are enveloped. This enables formation of the insole 11 having a more optimal shape.

In the insole 10, since the film portion 14 which seals the footprint resin portion 12 is a polyethylene film, the polyethylene film can seal the footprint resin portion 12 without sticking to it heavily. For this reason, there is an advantage in that the film portion 14 of the insole 11 molded and hardened in the shape of the foot 3 of the user can be easily peeled.

Further, the method for manufacturing the insole according to the embodiment of the present invention has an effect of providing a comfort fit because after the user's footprint is fitted, the sponge sheet 16 having flexibility can be bonded to a part to be in contact with the sole of the foot 3.

LIST OF REFERENCE NUMERALS 2 shoe, 3 foot, 10, 11 insole, 12 footprint resin portion, 14 film portion, 15 vacuum-packed portion, 16 sponge sheet.

The invention claimed is:

1. A method for manufacturing an insole, comprising:
a first step of forming a footprint resin portion having a footprint shape and a predetermined thickness using a thermoplastic resin which melts at a predetermined temperature;
a second step of performing shrink processing such that the footprint resin portion is covered with a film, and thereafter vacuum packing the footprint resin portion covered with the film in a nylon polyethylene bag, wherein the film covers the whole surface of the footprint resin portion and is shrunk while air is removed to seal the footprint resin portion;
a third step of heating to melt the sealed footprint resin portion manufactured through the first step and the second step at a predetermined temperature;
a fourth step of attaching the heated and sealed footprint resin portion melted by the third step to the inside of a shoe of a user, and hardening the footprint resin portion by leaving the footprint resin portion to stand inside the shoe for a predetermined time period while the user is wearing the shoe; and
a fifth step of peeling the film from the hardened footprint resin portion after the third step and the fourth step, and thereafter attaching a flexible sheet portion to a side of the footprint resin portion to be in contact with the user's sole.

2. The method for manufacturing the insole according to claim 1,
wherein the thermoplastic resin comprises a polycaprolactone resin which melts at 60 to 70° C., and
the film comprises a polyethylene film.

3. The method for manufacturing the insole according to claim 1,
wherein the predetermined thickness is from 2 mm to 3 mm.

4. The method for manufacturing the insole according to claim 1,
wherein the nylon polyethylene bag comprises at least two layers of nylon and polyethylene.

* * * * *